United States Patent
Fukagawa et al.

[11] Patent Number: 5,992,885
[45] Date of Patent: Nov. 30, 1999

[54] FUEL CYLINDER MOUNTING STRUCTURE IN MOTORCAR

[75] Inventors: Masami Fukagawa; Masayuki Sano, both of Wako, Japan

[73] Assignee: Honda Giken Kogyo Kabushiki Kaisha, Tokyo, Japan

[21] Appl. No.: 08/855,723

[22] Filed: May 8, 1997

[30] Foreign Application Priority Data

May 9, 1996 [JP] Japan ................................. 8-114732

[51] Int. Cl.⁶ ................................................. B60K 15/07
[52] U.S. Cl. ................................... 280/830; 280/834
[58] Field of Search .................... 280/830, 834; 224/42.12, 42.23, 538

[56] References Cited

U.S. PATENT DOCUMENTS

| | | | |
|---|---|---|---|
| 3,642,296 | 2/1972 | Froumajou | 280/834 |
| 4,384,815 | 5/1983 | Suzuki et al. | 224/42.23 |
| 4,428,513 | 1/1984 | Delmastro | 224/42.12 |
| 4,717,171 | 1/1988 | Kami et al. | 280/834 |
| 5,794,979 | 8/1998 | Kasuga et al. | 280/834 |

FOREIGN PATENT DOCUMENTS

| | | |
|---|---|---|
| 50-41627 | 11/1975 | Japan . |
| 7-186741 | 7/1995 | Japan . |

*Primary Examiner*—Lanna Mai
*Assistant Examiner*—Michael Cuff
*Attorney, Agent, or Firm*—Armstrong, Westerman, Hattori, McLeland & Naughton

[57] ABSTRACT

A fuel cylinder mounting structure of a motorcar wherein a fuel cylinder can be attached together with suspensions and a spare tire easily so that productivity is improved, the vehicle can be made small and light, and reduction of cost can be attempted is provided. The fuel cylinder mounting structure comprises a fuel cylinder for storing compressed fuel gas; a chassis frame having a rectangular frame-like shape, supporting the fuel cylinder and attached to a car-body frame from the bottom; a protection plate fixed to the chassis frame for covering the fuel cylinder from the bottom; suspensions attached to both sides of the chassis frame and modularized with the chassis frame; and a spare tire rack attached under a rear car-body and supporting a spare tire laid down so as to be hung in rear of the protection plate.

4 Claims, 4 Drawing Sheets

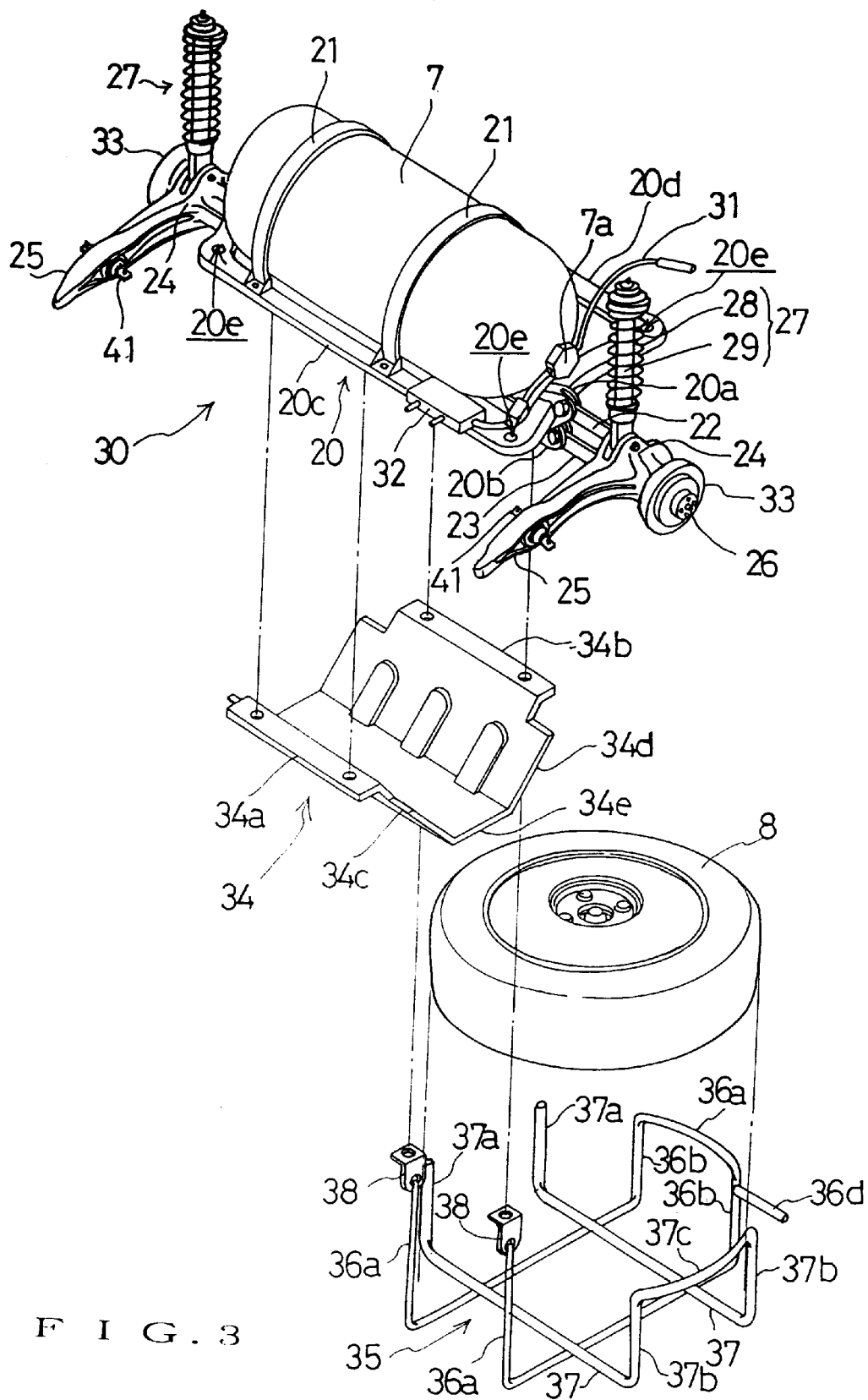
F I G. 3

FUEL CYLINDER MOUNTING STRUCTURE IN MOTORCAR

BACKGROUND OF THE INVENTION

The present invention relates to a fuel cylinder mounting structure of a motorcar running by a gas fuel such as natural gas.

Such a fuel cylinder is constructed strong so as to be durable against pressurizing because it stores a natural gas compressed at a high pressure and therefore the fuel cylinder is larger and heavier compared with a conventional gasoline tank.

Usually, the fuel cylinder is mounted in a car body at a place in rear of a rear seat and between right and left rear wheel houses as shown in Japanese Laid-Open Patent Publication No. Hei 7-186741. In this prior art, the fuel cylinder is supported on a rear floor through a chassis frame and a spare tire is placed on the rear floor within a trunk, separately from the fuel cylinder. Rear suspensions under the rear floor are also attached to the car body separately from the fuel cylinder.

In case of the gasoline tank lighter than the fuel cylinder, there is an example in which the tank is attached to the car body from the bottom as shown in Japanese Utility Model Publications No. Sho 62-42863 and No. Sho 50-41627. In this example, the spare tire is also hung on a lower surface of a rear car-body.

According to the above-mentioned Japanese Publication No. Hei 7-186741, when the fuel cylinder is mounted, firstly the chassis frame is attached to the car body at a predetermined position, then the fuel cylinder is brought in through an opening with a rear window removed, placed on the chassis frame and fixed by a fixing band. Therefore, there is required much trouble to attach the fuel cylinder. Moreover, the spare tire and the rear suspension must be attached each separately so that man-our for fitting work increases to lower productivity.

Because package of respective members are also arranged separately and require respective attachment parts, the weight is increased, the cost is raised and the vehicle comes to be large-sized.

In the latter example having the gasoline tank hung, the fitting work is somewhat easy because the gasoline tank and the spare tire are attached to the rear car-body from the bottom. However, rear suspensions must be attached separately, therefore, so much reduction of man-hour of fitting work cannot be expected.

In this example, besides, the gasoline tank has a inclined lower surface projected under the car-body, so that when the spare tire is pushed forward by an external force acting from the rear, the spare tire falls along the inclined lower surface of the gasoline tank to protect the gasoline tank. However, in case of the fuel cylinder which is cylindrical in general, it is difficult to form the lower surface in a inclined surface, moreover it is necessary to protect the fuel cylinder from a flying stone or the like.

SUMMARY OF THE INVENTION

The present invention has been accomplished in view of the foregoing and one object of the invention is to provide a fuel cylinder mounting structure of a motorcar in which the fuel cylinder is mounted together with suspensions and the like to improve workability and can be protected from flying stones or the like and a shock from the rear.

In order to attain the above object, the present invention provides a fuel cylinder mounting structure in a motorcar, comprising a fuel cylinder for storing compressed fuel gas; a chassis frame having a rectangular frame-like shape, supporting the fuel cylinder and attached to a car-body frame from the bottom; a protection plate fixed to the chassis frame for covering the fuel cylinder from the bottom; suspensions attached to both sides of the chassis frame and modularized with the chassis frame; and a spare tire rack attached under a rear car-body and supporting a spare tire laid down so as to be hung in rear of the protection plate.

The chassis frame supporting the fuel cylinder, the protection plate and the suspensions are integrally attached to each other to be modularized, and the module is attached to the car-body frame from the bottom so that man-hour for fitting work is reduced and productivity can be improved. Further, since the number of required attachment parts is few, the vehicle can be made small and light and reduction of cost can be attempted.

Since the protection plate covers the fuel cylinder from the bottom, the fuel cylinder can be protected from flying stones or the like and a shock from the rear If the spare tire rack has a front end pivot portion attached to a rear part of the chassis frame, and the spare tire supported by the spare tire rack is hung along the rear car-body in rear of the protection plate, even if the spare tire is moved forward by the shock from the rear, the spare tire is guided by the protection plate to avoid the fuel cylinder for protecting the fuel cylinder and preventing the fuel cylinder from going into the car-room.

If the protection plate has a rear surface inclined downward toward the front, even if the spare tire is moved forward by the shock from the rear, the spare tire moves along the inclined rear surface of the protection plate and avoid the fuel cylinder more easily for protecting the fuel cylinder and preventing the fuel cylinder from going into the car-room.

If the spare tire is supported by the spare tire rack in a attitude inclined downward toward the front at a position in rear of the chassis frame, the spare tire can avoid the fuel cylinder more easily when the spare tire is moved by the shock from the rear, besides, overall length of the motorcar can be shortened.

BRIEF DESCRIPTION OF THE DRAWINGS

FIG. 3 is an exploded perspective view showing an assembled structure of a fuel cylinder, rear suspensions, a spare tire and the like.

DETAILED DESCRIPTION OF THE PREFERRED EMBODIMENT

Hereinafter, a preferred embodiment of the present invention will be described with reference to FIGS. 1 to 4.

Figure 1:
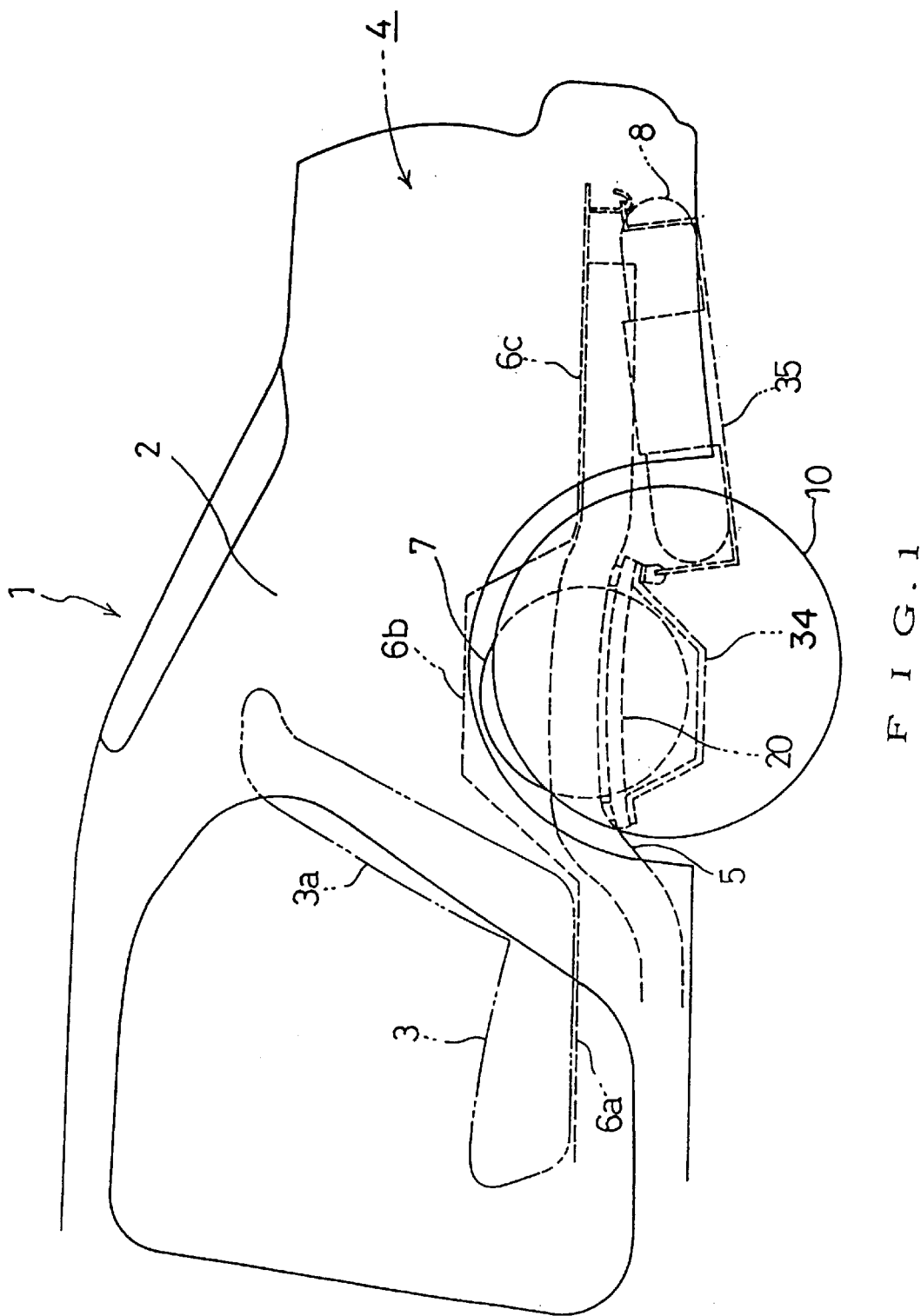
FIG. 1 is a side view showing a rough internal construction of a rear car-body of a motorcar according to one embodiment of the present invention.

The motorcar according to the present embodiment is a FF car (Front engine—Front drive type car). FIG. 1 is a side view showing a rough internal construction of a rear car-body of such a motorcar 1.

Figure 2:
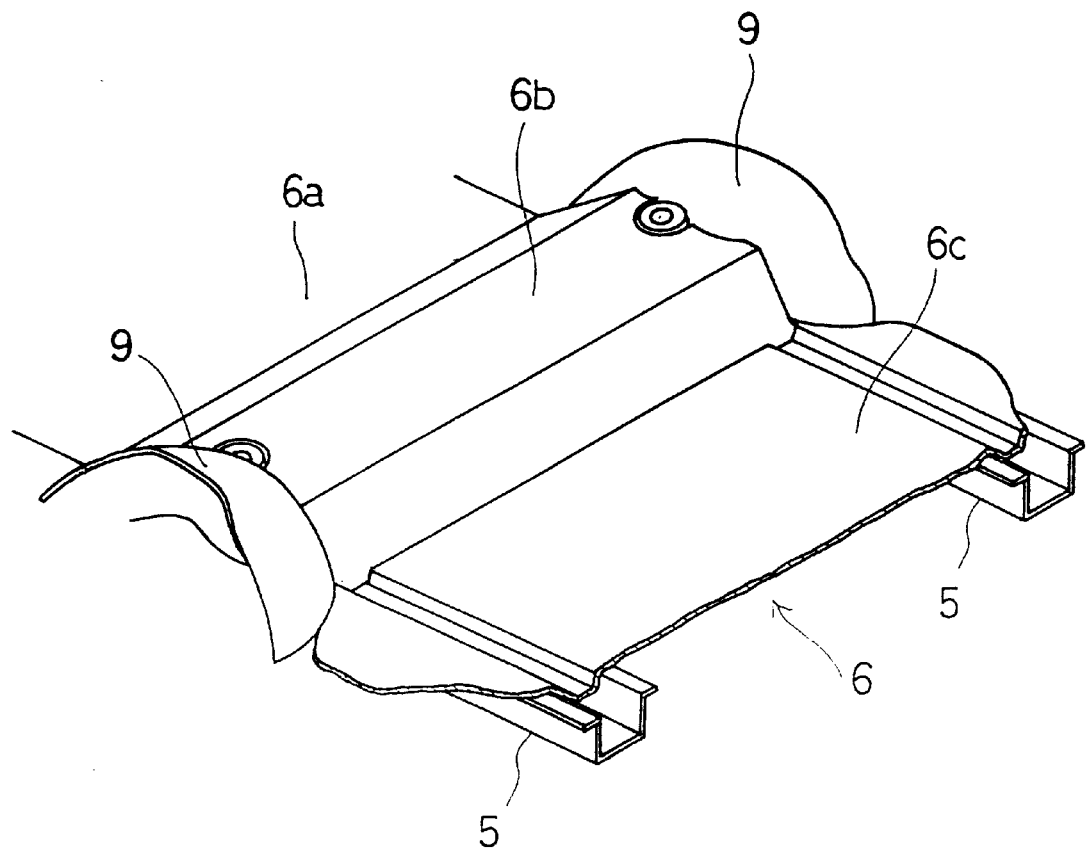
FIG. 2 is a partly omitted perspective view showing a rear floor panel and a car-body frame.
Figure 4:
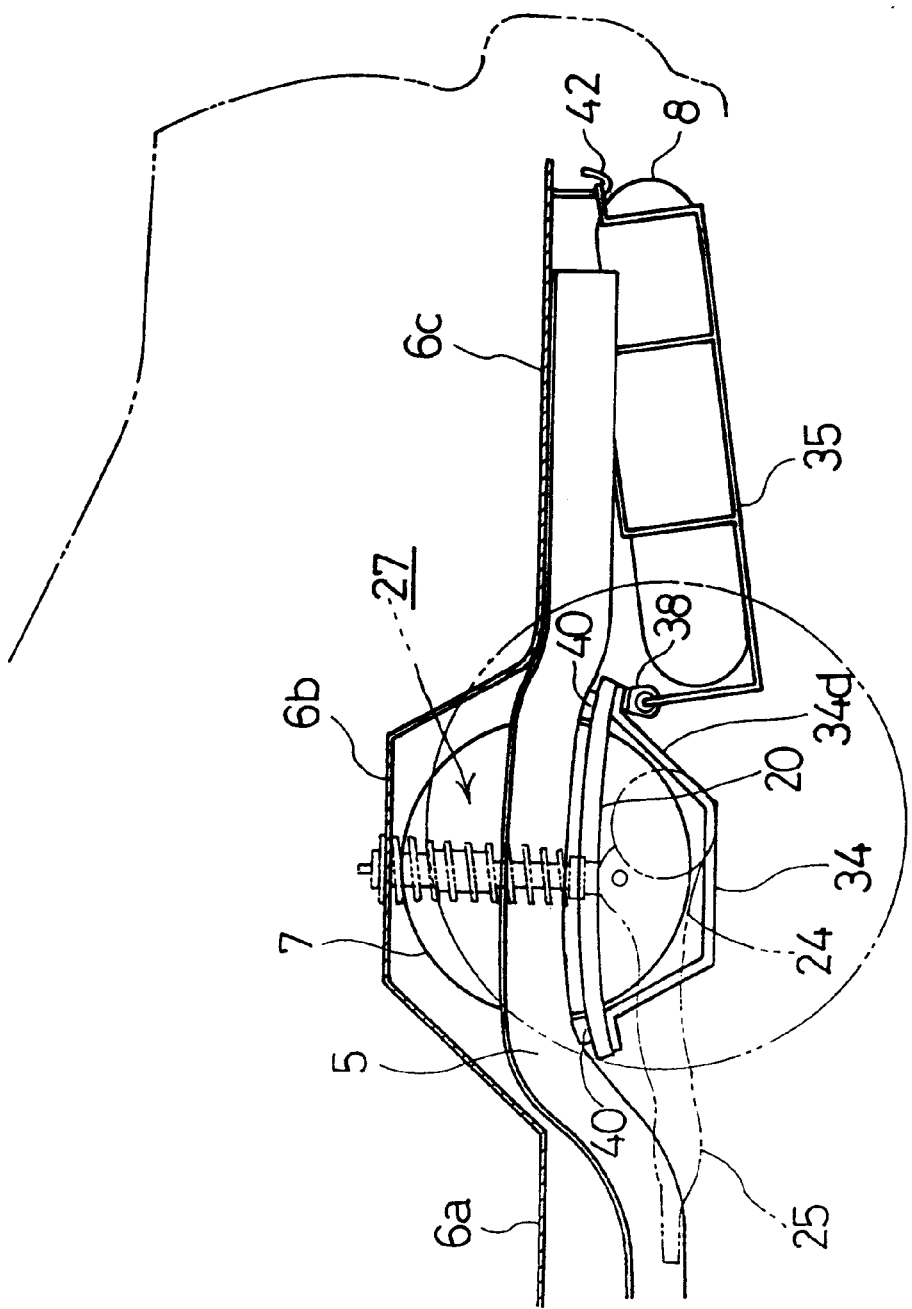
FIG. 4 is a sectional view showing the fuel cylinder and the like attached to the rear car-body.

Within a car-body 1, a space including a trunk room 4 is formed in rear of a seat back 3a of a rear seat 3. At the lower part of the space, a rear floor panel 6 extends in front and rear direction lying on a pair of right and left car-body frames 5, 5 as shown in FIG. 2. The rear floor panel 6 has a seat supporting portion 6a lying along a lower surface of the rear seat 3, a rear horizontal portion 6c extending rearward horizontally, and a upwardly swelled trapezoidal portion 6b formed between the two portions 6a and 6c and in rear of the seat back 3a.

A fuel cylinder 7 is hung under the swelled portion 6b with an upper half received in the swelled portion, and a spare tire 8 is hung along a lower surface of the rear horizontal portion 6c, inclined downward toward the front. The trunk room 4 is formed above the rear horizontal portion 6c.

At right and left ends of the swelled portion 6b of the rear floor panel 6 are fixed rear wheel houses 9, 9 swelled more upward in shapes of circular arcs. The wheel houses 9, 9 cover upper halves of rear wheels 10, 10.

The fuel cylinder 7 for storing compressed natural gas is cylindrical and has a mouth piece 7a provided on one of hemispherical both ends. As shown in FIG. 3, the fuel cylinder 7 is supported on a chassis frame 20 of rectangular frame-like shape wound by right and left fixing belts 21. The fixing belts 21 are integrally connected to the chassis frame 20 at right and left positions respectively, and wind round the outer periphery of the fuel cylinder 7 to tighten and fix it.

On respective right and left sides of the chassis frame 20 are projected upper and lower pivot portions 20a, 20b to which inner ends of an upper arm 22 and a lower arm 23 are pivoted respectively so as to swing up and down. Outer ends of the upper and lower arms 22, 23 are pivoted to a knuckle 24 for forming a parallel link.

From the knuckle 24, a trailing arm 25 extends forward and an axle 26 for pivotally supporting the rear wheel 10 projects together with a brake disk 33 outward. At an upper end of the knuckle 24 is pivoted a lower end of a rear suspension 27 which comprises a damper 29 with a coil spring 28 wound round the outer periphery.

The fuel cylinder 7 supported on the rectangular chassis frame 20 fitted thereto from the above has a lower part protruded downward from the chassis frame 20 and a protection plate 34 for covering the protruded lower part of the fuel cylinder 7 from the bottom is attached to the chassis frame 20.

The protection plate 34 is formed by bending a rectangular plate in a shape of channel and has front and rear attachment sections 34a, 34b, front and rear slant side plate sections 34c, 34d and a bottom plate section 34e. When the front and rear attachment sections 34a, 34b are contacted with a front frame member 20c and a rear frame member 20d and fixed by bolts, the front and rear side plate sections 34c, 34d and the bottom plate section 34e cover around the lower part of the fuel cylinder 7.

To the chassis frame integrally supporting the fuel cylinder 7 as mentioned above is attached, besides the protection plate 34, the knuckle 24 through the upper arm 22 and the lower arm 23 swingably up and down. The axle 26, the brake disk 33 and the rear suspension 27 are attached to the knuckle 24 to constitute a module 30 as a whole.

Fuel pipes 31 around the fuel cylinder 7 extending from the mouth piece 7a of the cylinder 7 and a joint box 32 on which the pipes 31 concentrate are arranged integrally with the module 30.

A pair of right and left hinges 38 pivoted to a front end of a spare tire rack 35 are fixed by bolts to a rear frame member 20d directed in right and left direction of the rectangular frame-like chassis frame 20 with the attachment section 34b of the protection plate intervening, so that the spare tire rack 35 is arranged in rear of the chassis frame swingably up and down.

The spare tire rack 35 is constructed by assembling two parallel bar members 36 directed in front and rear direction and other two parallel bar members 37 directed in right and left direction in projected parallels.

The bar members 36 directed in front and rear direction have front rising portions 36a and rear rising portions 36b. On the upper ends of the front rising portions 36a are pivoted the hinges 38, and the upper ends of the rear rising portions 36b are connected with each other by a connecting portion 36c from which a handle 36d projects leftward.

The spare tire 8 is laid on the projected parallels of the spare tire rack 35, thereby the outer periphery of the tire is held and supported by the right and left rising portions 37a, 37b and the rear rising portions 36b.

The module 30 to which the front end portion of the spare tire rack 35 supporting the spare tire 8 is attached is fitted to the rear portion of the car-body from the bottom.

At the four corners of the chassis frame 20 are formed attachment holes 20e in which floating mounts 40 with rubber bushes are fitted. The chassis frame 20 is attached to a lower surface of the car-body frame 5 through the floating mounts 40 with an upper half of the fuel cylinder 7 received in the swelled portion 6b of the rear floor panel 6.

An upper end of the rear suspension 27 having the lower end pivoted to the knuckle 24 is attached to the rear wheel house 9 and a front end of the trailing arm 25 extending forward is attached to the car-body frame 5 through a bush 41.

The connecting portion 36c connecting rear ends of the bar members 36 is engaged with a hook 42 hung from a rear end of the rear floor panel 6 for hanging the spare tire 8 along the lower surface of the floor panel 6 by the spare tire rack 35.

The spare tire is hung inclined downward toward the front at the rear of the chassis frame 20 with the front part positioned lower than the chassis frame 20.

The spare tire rack 35 can be disengaged from the hook 42 by means of the handle 36d in order to swing for taking in and out of the spare tire 8.

As described above, the rear suspensions 27 are attached to the chassis frame 20 supporting the fuel cylinder 7 to form an integrated module 30 and these are attached to the car-body frame from the bottom, so that man-our of work is few, assembling work is simple and improvement of productivity can be attempted. Further, the number of required attachment parts is few, the vehicle can be made small and reduction of cost can be attempted.

Since the spare tire rack 25 supports the spare tire 8 so that the spare tire 8 is hung along the lower surface of the rear floor panel 6 inclined downward toward the front at the position in rear of the chassis frame 20, overall length of the motorcar can be shortened and freedom of design is enlarged. Since the suspensions 27 have the lower end portions attached to the chassis frame 20 which is made strong and heavy, unsprung weight is increased and a comfortable ride can be obtained.

Since the lower face of the fuel cylinder 7 is covered with the protection plate 34, the fuel cylinder can be protected from flying stones or the like.

Further, the rear side plate section 34d of the protection plate 34 is inclined downward toward the front and the spare tire 8 is hung by the spare tire rack 35 at the position in rear of the rear side plate section 34d, so that even if an external force acts on the spare tire 8 from the rear to push the tire forward, the spare tire 8 falls down along the inclined rear side plate section 34d to prevent the fuel cylinder 7 from being damaged and going into the car-room.

What is claimed is:

1. An assembly adapted to a motorcar, said assembly comprising:

a fuel cylinder for storing compressed fuel gas;

a chassis frame having a rectangular frame shape, supporting said fuel cylinder and attached to a car-body frame from the bottom;

a protection plate fixed to said chassis frame for covering said fuel cylinder from the bottom;

suspensions attached to both sides of said chassis frame and modularized with said chassis frame; and a spare tire rack attached under a rear car-body and supporting a spare tire laid down so as to be hung in rear of said protection plate.

2. The assembly adapted to a motorcar as claimed in claim 1, wherein said spare tire rack has a front end pivot portion attached to a rear part of said chassis frame, and said spare tire supported by said spare tire rack is hung along said rear car-body in rear of said protection plate.

3. The assembly adapted to a motorcar as claimed in claim 2, wherein said protection plate has a rear surface inclined downward toward the front.

4. The assembly adapted to a motorcar as claimed in claim 2 or 3, wherein said spare tire is supported by said spare tire rack in an attitude inclined downward toward the front at a position in rear of said chassis frame.

* * * * *